United States Patent [19]
Ricciardi et al.

[11] 3,884,848
[45] May 20, 1975

[54] MANUFACTURE OF MEMBRANE-FREE NONLUSTROUS POLYURETHANE FOAM

[75] Inventors: Michael A. Ricciardi, Conyngham; Michael L. Cordora, Exeter, both of Pa.; David Smudin, Piscataway, N.J.

[73] Assignee: Tenneco Chemicals, Inc., Saddle Brook, N.J.

[22] Filed: Jan. 7, 1974

[21] Appl. No.: 431,512

Related U.S. Application Data

[63] Continuation-in-part of Ser. No. 415,609, Nov. 14, 1973, abandoned.

[52] U.S. Cl....260/2.5 BD; 260/2.5 AG; 260/2.5 AH; 260/2.5 AL; 260/2.5 AM
[51] Int. Cl.............................................. C08g 22/44
[58] Field of Search... 260/2.5 AH, 2.5 AG, 2.5 AL, 260/2.5 BE, 2.5 AN, 2.5 BD, 2.5 AM

[56] References Cited
UNITED STATES PATENTS

| | | | |
|---|---|---|---|
| 3,304,273 | 2/1967 | Stamberger | 260/2.5 BE |
| 3,384,599 | 5/1968 | Omietanski et al. | 260/2.5 AH |
| 3,644,229 | 2/1972 | Butler et al. | 260/2.5 AG |
| 3,775,350 | 11/1973 | Juhas | 260/2.5 BE |

OTHER PUBLICATIONS

Buttrey D.N. "Plasticizers" Interscience Publishers, Inc. New York. 1947. p 81 & 83.

Primary Examiner—Donald E. Czaja
Assistant Examiner—C. Warren Ivy
Attorney, Agent, or Firm—John Boustead; James P. Scullin

[57] ABSTRACT

This invention provides a substantially nonlustrous highly open urethane foam by the addition to the mixture foamed of a small amount of an ester of the formula $(RCOO)_n R'$, wherein R and R' are alkyl or alkenyl groups having from one to 30 carbon atoms, at least one of R and R' having at least three carbon atoms, and wherein $n$ is an integer from 1 to 3, for example, stearyl methacrylate, i.e., octodecyl methacrylate. When n is one, at least one of R and R' has at least eight carbon atoms. A polyether-polyol type foam-stabilizing organo-silicon emulsifier is also added. Pigment and other conventional additives can also be added, if desired.

11 Claims, No Drawings

MANUFACTURE OF MEMBRANE-FREE NONLUSTROUS POLYURETHANE FOAM

This application is a continuation-in-part of our co-pending application, Ser. No. 415,609, filed Nov. 14, 1973, entitled "Manufacture of Polyurethane Foam", now abandoned.

Cellular solid polymers, often referred to as "foams," can be prepared by generating a gas during the polymerization of the liquid reaction mixture. The gas generated causes foaming of the reaction material which is normally in a plastic or liquid state. The polymerization reaction continues while the foaming occurs until the polymer sets or gels into the cellular pattern formed by the foam bubbles. The solidified polymer thus becomes a cellular solid mass popularly, although somewhat inaccurately, known as a "foam." Polyurethane foams can be prepared by the reaction of a polyol and a polyisocyanate in the presence of blowing agent such as water, and usually, a reaction catalyst and foam stabilizer.

The cellular solid polymer comprises a skeletal framework of relatively heavy strands forming an outline for the cell structure. The strands of the skeletal framework are conventionally connected by very thin membranes, or windows, which form the walls of the cells. In open-celled foams, some or most of the windows are missing, or open or torn, in each cell thus forming an interconnecting network open to fluid flow.

Furthermore, for many purposes, the appearance of reticulated open-cell foam has been superior to the less open, as-polymerized, foam. When the foam is used, e.g., as an insulating liner for fabrics, the intact cell walls, or windows, create an undesirable sparkling quality, or luster, which can shine through the fabric unless an expensive closely knit or woven fabric is used.

In the commercial, flexible polyester-type polyurethane foam, a proportion of the cell walls rupture spontaneously during foaming, thus forming a porous cellular solid, known as an open-celled foam. Such open-celled foams, however, generally are not sufficiently porous or open-celled to permit the passage of fluid as would be necessary for use as filters or as a baffle, or diffuser, to prevent explosions. Accordingly, in attempting to improve the properties of such open-celled foams in a desired direction, the art has tried various post-foaming methods of reticulating, or increasing the degree of openness, by breaking or removing the residual cell windows of such foams.

U.S. Pat. No. 3,748,288, dated July 24, 1973, naming Winkler, Bredbenner and Adlum as inventors, describes a process for the preparation of a substantially membrane-free polyurethane foam in which a hydrophilic organosilicon foam-stabilizing emulsifier-surfactant and a hydrophobic, anti-foaming organo-silicon compound are present in the reaction mixture from which the foam is prepared.

In accordance with the present invention, it has been discovered that substantially membrane-free nonlustrous polyurethane foams can also be produced by using, in place of the aforementioned hydrophobic, anti-foaming organo-silicon compound, at least one ester of the formula $(RCOO)n\ R'$, wherein R and R' are alkyl or alkenyl groups having from one to 30 carbon atoms, at least one of R and R' having at least three carbon atoms, and wherein $n$ is an integer from 1 to 3. When $n$ is one, at least one of R and R' has at least eight carbon atoms. Among the esters of the formula $(RCOO)n\ R'$ which can be utilized in accordance with this invention are stearyl methacrylate, 2-ethylhexyl acrylate, butyl oleate, oleyl oleate, butyl stearate, trimethylolpropane trimethacrylate and ethylene glycol dimethacrylate.

The above-mentioned hydrophobic, anti-foaming organo-silicon compounds generally contain a significant proportion of hydrophilic groups to render the compound water-soluble, and hydrophobic silicon groups which are oil-soluble. The presence of these opposing groups provide the surface active and emulsifying power of the material, which is the reason for selecting these materials. Contrary to this, the compound $(RCOO)n\ R'$ as defined above contains substantially no hydrophilic groups.

In accordance with this invention, a highly porous, open-pore, substantially membrane-free, nonlustrous foam can be prepared from the reaction of a polyol and water with an organic polyisocyanate when the mixture foamed contains a hydrophilic organosilicon foam-stabilizing emulsifier-surfactant and at least one compound of the formula $(RCOO)n\ R'$ as defined above.

The polyols suitable for use in the present invention can be polyether polyols, such as those made by the addition of an excess of propylene - 1,2-oxide to ethylene glycol, trimethylolpropane, pentaerythritol, alphamethylglucoside, sorbitol or sucrose. Also, the polyols suitable for use in this invention can be a mixture of polyester polyols and polyether polyols, the mixture containing by weight at least two per cent of a polyether polyol. The polyester polyol can be prepared, for example, by reacting a dicarboxylic acid, such as adipic acid, with a mixture of a diol, such as diethylene glycol, and a triol, such as glycerol. The emulsifier-surfactant is a hydrophilic organo-silicon polymer designed and adapted for use in the preparation of urethane foam from a polyether polyol and an organic polyisocyanate and water.

The polyether polyol can also be selected from any of the wide variety of polyhydric polyether compounds available and conventionally used by the art for the preparation of polyether-type polyurethanes. The most common polyether polyol compounds, the polyoxyalkylene polyether polyols, are generally prepared by the reaction of an alkylene oxide, such as propylene - 1,2-oxide, with a polyhydric monomer. The polyhydric monomer can be selected from among the same polyhydric alcohols recited above for use in preparation of the polyester; preferably, however, a higher average functionality is useful for a polyether polyol. Therefore, a high proportion of trihydric polyols, such as glycerol, trimethylolethane and trimethylolpropane, or polyols with more than 3 hydroxyls, such as pentaerythritol, arabitol, sorbitol and xylositol, are presently used in the mixture of monomers used to prepare the polyether polyols.

The alkylene oxides used in preparing the polyethers preferably are these which contain from two to about four carbon atoms, for example, ethylene oxide, 1,2-propylene oxide and 1,2-butylene oxide, and homopolymers and copolymers thereof. Other reactants can also be used in preparing the polyhydric polyalkylene ether, such as glycidol and cyclic ethers like di- and tetramethylene ethers, and epihalohydrins, e.g., epichlorohydrin.

Also useful are the polyaralkylene ether polyols which are derived from the corresponding aralkylene oxides such as for example styrene oxide, alone or mixed with alkylene oxide.

Generally, propylene oxide, i.e., the 1,2-propylene oxide, and mixtures of 1,2-propylene oxide with ethylene oxide are preferred for the preparing of the polyether polyol reactant.

The polyethers for use in the present invention preferably have a molecular weight of from about 2,000 to about 4,500 and optimally of from about 2,800 to about 3,800 and a hydroxy functionality of at least 2.0 to about 8.0, and preferably an average hydroxy functionality of from about 2.5 to about 5.0.

The polyester polyol reactants useful in the present invention include any conventionally used in the preparation of flexible and semi-flexible urethane polymer foams. The polyhydric polyester reactant usually has a molecular weight of at least about 400 and optimally between about 500 and about 5,000. The hydroxyl number of the compound is correspondingly in the range of from about 15 to about 300. Generally a polyester having a molecular weight of greater than about 10,000 is difficult to handle commercially because of the difficulty of completely mixing such a high viscosity compound into the reaction mixture. However, in circumstances where a high molecular weight reactant is desired and where the suitable powerful mixing apparatus is available, the higher molecular weight compound can be used; the only significant limitation is that the compound contain at least two active hydrogen groups, preferably hydroxyl groups. The preferred hydroxyl functionality for the polyester resins is from about 2.2 to 2.8.

The range of polyester polyol compounds useful for preparing the polyurethane foams in the present invention are well known to the art and can be prepared by, for example, the reaction of a polyhydric alcohol with a polycarboxylic acid compound, each containing from two to about 36 carbon atoms in the molecule. The polycarboxylic acid includes such acid precursors as the corresponding acid anhydrides or acid halides or even, for example, alkyl esters. The preferred acids are the dicarboxylic acids containing from about four to about 12 carbon atoms in the molecule. Examples of such preferred carboxylic acid compounds which can be used include, for example, aromatic acids such as phthalic acid, terephthalic acid, isophthalic acid, tetrachlorophthalic acid, cycloaliphatic acids such as dimerized linoleic acid, maleated and fumerated resin acids and cyclohexane-1,4-diacetic acid, but especially the aliphatic acids such as tricarballylic, oxydipropionic, succinic, glutaric, adipic, azelaic, suberic, sebacic acids, or combinations of such acids. The polyester polyols can also be prepared from corresponding lactones, such as gamma-butyro; or E-epsilon caprolactones, for example.

The polyhydric alcohol used in the preparation of this polyester polyol is generally a mixture of a dihydric and a trihydric, or polyhydric alcohol of high hydroxyl value. Preferably, a mixture of polyols, the major portion having a functionality of two and the minor a functionality of three is used. This mixture of di- and trifunctional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the present invention are also conventional. They contain at least two isocyanate groups per molecule. Preferably, the isocyanate mixture selected has an isocyanate functionality of from about 2 to about 3.0. The useful isocyanates include for example the aromatic, aliphatic, cycloaliphatic and heterocyclic polyisocyanates.

Suitable organic polyisocyanates include, for example, n-butylene di-isocyanate, methylene diisocyanate, m-xylylene diisocyanate, p-xylene diisocyanate, cyclohexyl-1,-4-diisocyanate, dicyclohexylmethane-4,4'-diisocyanate, m-phenylene diisocyanate; p-phenylene diisocyanate, 3-(alpha-isocyanatoethyl)-phenyl isocyanate, 2,6-diethylbenzene-1,4-diisocyanate, diphenyldimethylmethane-4,4'-diisocyanate, ethylidene diisocyanate, propylene-1,2-diisocyanate, cyclohexylene-1,2-diisocyanate, 2,4-toluene diisocyanate. 2,6-toluene diisocyanate, 3,3'-dimethyl-4,4'-biphenylene diisocyanate, 3,3'-dimethoxy-4,4'-biphenylene diisocyanate, 3,3-diphenyl-4,4'-biphenylene diisocyanate, 4,4'-biphenylene diisocyanate, 3,3'-dichloro-4,4'-bipheylene diisocyanate, 1,5-naphthylene diisocyanate and isophoron diisocyanate.

The aromatic diisocyanates are generally the least expensive and most reactive polyisocyanates available and, therefore, are preferred. The aromatic diisocyanates, especially the toluene diisocyanate isomers, are used commerically in the preparation of foam by the one-shot, continuous slab-stock process. However, for certain purposes, other polyisocyanates, especially the aliphatic, aralkyl and cycloalkyl polyisocyanates have valuable properties and can be used alone, or, if desired, in admixture with, e.g., toluylene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

It is recognized in the art, that the preparation of a commercially useful foam requires the careful balancing of a large number of factors, including not only the primary reactants recited above, but also the catalyst, surfactant, temperature, speed of feeding of the foaming mixture and other reaction conditions. In the process of the present invention, however, the proportion and type of ester (RCOO)nR' as defined above is an added factor which must be included in the balance. The general procedures and problems of providing a balanced mixture are well known to those skilled in the art. It is a matter of routine to those so skilled to prepare a balanced formulation for use in a given process and with available apparatus.

For example, the proportions of the polyisocyanate reactant to the total polyhydric reactants, including water, can be varied as one means for changing the properties of the urethane foam desired. Usually, the total (—NCO) equivalent to total active hydrogen equivalent, i.e., polyether and polyester hydroxyl plus water, should be such as to provide a ratio of from about 0.70 to about 1.3 equivalents of —NCO per equivalent of active hydrogen, preferably a ratio of from about 1.0 to about 1.1 equivalent of —NCO per reactive hydrogen. Different ratios can be used; preferably, however, usually an excess of the isocyanate reactant is used in order to obtain a fully polymerized stable useful product.

The preferred foaming agent for general use in the production of polyurethane foam is water. Thus advantages of using water are low cost and the stability which the use of water adds to the foam-making. The water-isocyanate reaction gives not only gas for blowing, but urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about −40°C. and +70°C., including methylene chloride, the Freon fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures and the like, and various thermal unstable compounds which liberate gases, e.g., $N_2$, upon heating, such as $N,N^1$ dimethyldinitrosoterephthalamides, are sometimes employed.

Commercially, a catalyst is usually employed in the process of preparing a foamed polyurethane. Generally, a combination of two catalysts is conventionally used to catalyze two separate reactions which occur when using water as the foaming agent. A first catalyst is for the polymerization reaction between the isocyanate and the hydroxy compound, a second catalyst is for the blowing reaction between water and the isocyanates. The various catalysts useful for each type of reaction are well known in the art. It is commonly understood that tertiary amines are effective and tend to favor reaction of isocyanate with water and that transition metal salts, and complexes, favor the polymerization reaction with the polyol.

The most preferred metal catalysts include tin compounds and iron compounds. Other metal compounds which can be used include compounds of cobalt, lead, vanadium, chromium, tungsten, antimony and titanium.

Examples of tertiary amine catalysts include triethylenediamine, N-ethylmorpholine, N,N,N',-N'-tetramethyl-1,3-butanediamine and bis 2-(N,N-dimethylamine) ethyl ether and other such compounds.

Useful tin compounds include stannous salts, e.g., stannous octoate and stannous oleate, and the covalently linked organotin compounds such as dibutyl tin diacetate and tributyltin oxide. Mixtures of the tertiary amines are generally used commercially; preferably a mixture of tertiary amine catalyst and tin compound is used.

Each type of catalyst, if present, is generally added in amounts of from about 0.05 to about 2 weight percent and preferably from about 0.1 to about 1 weight percent, based on the total weight of the active hydrogen-containing compounds present in the reaction, i.e., the polyester polyol and the polyether polyol.

It is conventional wisdom in the art, to utilize a foam-stabilizing emulsifier-surfactant and foaming agent in balanced proportions to obtain a foam of a desired cell size, structure and density. Generally, the emulsifier-surfactant is balanced with the amounts of catalyst and water to obtain the desired foam.

The foam-stabilizing organo-silicon emulsifiers used in the present invention are organo-silicon compounds, usually polymers, which are hydrophilic and preferably water-soluble as well as soluble in at least one of the polyols. Such organo silicon surfactant-emulsifiers are well known to the art, described extensively in the published literature, and sold commercially. The commercially available organo silicon surfactant-emulsifiers are generally sold with specific instructions as to their suitability for polyether polyol-type urethane foam production. Generally, a surfactant-emulsifier suitable for one polyol type is not suitable for use in a foaming reaction based on the other type. Further, these surfactant-emulsifiers are proprietary products, sold without disclosure as to their precise chemical structure. However, the surfactant-emulsifiers used for polyether polyol-containing reaction mixtures are known to depress the surface tension to a greater extent than do the organo silicon surfactants used with polyester polyols.

In the process of the present invention, however, where the urethane foam is prepared from a reaction mixture containing as the major portion of the polyol reagent a polyester polyol, it is surprising that the surfactant-emulsifiers which are most effective, are the type commercially used with polyether polyols.

The most generally available organo silicon emulsifier surfactants are polymers which contain a plurality of silicon atoms (which form part of the hydrophobic portion of the polymer molecule) and a long chain hydrophilic group, for example, including a polyoxyalkylene ether group. In the more common organo silicon emulsifier surfactant compounds, the silicon is present as a siloxane group, i.e., —Si—O.

A wide variety of molecular structures incorporating these two necessary elements, i.e., the long chain hydrophilic group and silicon atoms, have been used. For example, a first type of structure is a polymer containing a chain of siloxane groups, i.e.,

wherein L represents the number of siloxane groups, forming a backbone or spine of the molecule, to which are attached as pendant, or branched chains, one or more long chain hydrophilic groups, i.e., as one of the R groups. In a second type of structure, a chain of alternating siloxane and hydrophilic, e.g., oxyalkylene groups form a backbone or spine of the molecule. In a third, somewhat less common, type, the molecular spine is formed by a carbon chain, to which are attached pendant groups containing a silicon atom and a long chain hydrophilic group.

Other connecting groups can also be present in the above types of silicon-hydrophilic group-containing polymers; these include, for example, alkylene groups, carboxyl groups, carbamyl groups and amino groups.

The first type of polysiloxane backbone polymer can be represented by the following formula:

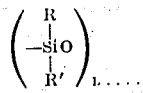

wherein L represents the number of siloxane groups and can be a number equal to at least two. Generally L is not greater than 100, but usually is a number from about 5 to about 20. At least one of R and R' in the molecule is a long chain hydrophilic group, such as, for example, a group including a polyoxyalkylene group $(C_pH_{2p}O)_m$, wherein $m$ is the number of oxyalkylene units, which can be connected to the silicon atom through a linking group such as an alkylene group or an oxygen atom. $p$ can be a number from two to about six, but preferably the group contains oxyethylene units, i.e., $p=2$, optimally in admixture with oxypropylene or other oxyalkylene units. Thus, optimally, $p$ is an average value depending upon which oxyalkylene units are present and in what proportion. Each silicon atom in the molecule need not, however, contain a long chain hydrophilic group.

The remaining R and R' groups are hydrophobic groups, preferably hydrocarbyl groups. The hydrocarbyl groups include those which contain up to about 20 carbon atoms, but preferably are selected from the group consisting of lower alkyl groups of up to about six carbon atoms, cycloalkyl groups of about five to about seven carbon atoms and aryl, aralkyl or alkaryl groups of from about six to about 12 carbon atoms. However, in the commercially available materials R is generally methyl. Other hydrocarbyl R and R' groups include, for example, ethyl, n-propyl, isopropyl, n-butyl, phenyl, o-tolyl, cyclohexyl and 2-methylcyclohexyl.

Examples of this first type or organo silicon emulsifier surfactant include compounds having the following general formula:

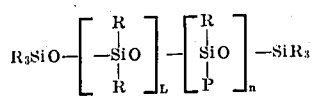

wherein P is selected from the group consisting of $—O(C_pH_{2p}O)_mA$ and $(C_p'H_{2p}'O)(C_pH_{2p}O)A$.

The second type of polymer, wherein the hydrophilic group is part of the spine or backbone of the polymer, includes compounds having the general formulas for example:

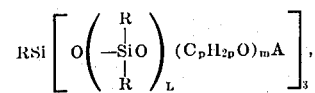

or $R_3SiO—(SiR_2O)L[SiR_2(OC_pH_{2p})_mO]_n—SiR_3$, and $R'O[(R_2SiO)_x]_a[(C_pH_{2p}O)_y]_bR''$.

In all of the above formulas A is a lower alkyl or a lower alkanoyl group, containing up to six carbon atoms, such as butyl and acetyl, n is at least one, need not be more than about 30, and preferably is two to about 20, and m is at least two, is generally not more than about 100 and preferably from 15 to about 50. $p$ is a number from two to about six and is optimally an average value between two and three; L is the number of siloxane units and is at least two; n and L units may be in blocks or as a random co-polymer; R, R' and R'' are hydrocarbyl groups, preferably lower alkyl of from one to 10 carbon atoms; R' and R'' are monovalent terminating groups: R' can be an alkyl group of from one to about 10 carbon atoms when attached to a siloxane group, and R'' can be also when it terminates a polyoxyalkylene group; x is an integer of at least 2, and preferably up to about 20; y is an integer of at least about 5, and preferably up to about 20; n is from 2 to about 4; and a and b are integers and preferably of from about 2 to about 20 each.

The above compounds and other related equally useful polymers are more fully described in U.S. Pat. Nos. 2,834,748, 3,145,185, 3,398,104, 3,402,192, 3,505,377, 3,525,705, 3,600,418, 2,970,150 and 3,230,185.

Other hydrophilic organo silicon-oxyalkylene copolymers useful as emulsifier surfactants are described in Belgian Pat. No. 743,889, which contains an oxalkylene group joined to silicon through carbamate group, i.e.,

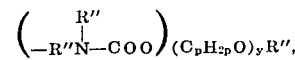

, or through a carboxyl group.

Other organo silicon emulsifier surfactants, are disclosed in Canadian Pat. Nos. 873,390, 860,995, 849,038, and 851,239; U.S. Pat. Nos. 3,541,031, 3,404,105, 3,230,185, 3,278,465, 3,577,362 and 3,165,843. U.S. Pat. Nos. 873,390, 3,404,105, 3,278,465, 3,230,188 and 3,165,843 (Example 4) especially show those polymers particularly adapted to use as emulsifier surfactants with polyether polyols. Also see the Boudeau article in the Jan., 1967 issue of *Modern Plastics*, supra, and the text on Urethane Polymers, by Sanders and Frisch, supra, and "Synthesis and Properties of Siloxane-Polyether Copolymer Surfactants" by Kenner et al., *I & EC Product Research and Development*, June, 1967, 6, page 88.

The hydrophilic organo-silicon surfactant-emulsifiers, such as the polysiloxane-oxalkylene copolymers can be present in amounts of from about 0.1 to about 5 percent by weight and preferably from about 1.0 to about 4 percent by weight based upon the total weight of organic polyhydric reactants, i.e., polyether and polyester polyols.

Other foam stabilizing emulsifiers available for polyester-polyol-type polyurethane foams can be used, in combination with the organo-silicon emulsifier-surfactants described above in the present invention. Such useful emulsifiers include, in particular, nonionic emulsifiers, such as oxyethoxylated tall oil, ethoxylated alkyl phenols, and some anionic surfactants, such as sodium lauryl sarcosinate, and various oil-soluble sulphonates. It is also known that various materials useful as plasticizers in synthetic resin plastics tend to stabilize foams. Such materials include tricresyl phosphate; epoxidized soybean oil; capped polyesters, e.g., the reaction product of a glycol, such as ethylene glycol, and a dicarboxylic acid, such as adipic acid, terminated by a monocarboxylic acid, such as acetic acid, or a monohydric alcohol, such as ethanol.

In addition, any of the various conventional pigments and fillers can be added including carbon black and the various white or color pigments. Such particulate fillers preferably have a particle size of from about 1 to about 50 microns. Pigments generally are present in amounts of from about 0.5 to about 15 percent by weight, based upon the total weight of the reaction mixture. For special purposes, highly filled foam containing 50 percent, or even more, filler has been used. Pigments or fillers are preferably added as dispersions, either in aqueous or non-aqueous dispersions. Although the particulate material can be added as powder to the urethane foam reaction mixture, it is more common practice to utilize the pre-dispersed commercially available materials.

Inhibitors against discoloration and aging, flame retardants and other materials can also be added if desired for the particular purpose for which a foam is to be used.

In carrying out the process according to this invention by the one-shot method, the various reactants and additives are fed to a mixing chamber in the desired ratios and speedily mixed in the chamber prior to being poured into a mold or on a conveyor. The foam according to this invention can be prepared by any conventional process for preparing a polyester polyurethane foam, with the addition of the desired amounts of the polyether polyol and the before-described ester $(RCOO)_nR'$ and polyether polyol type hydrophilic organosilicon foam stabilizer, or emulsifier-surfactant. Various continuous slab-stock processes are described which include forming the foam in buns having rectangular or round cross-section or even in toroidal shapes. For the preparation of the highly desirable round bun, see, for example U.S. Pat. Nos. 3,281,894; 3,296,658 and 3,476,845, all to Buff et al., and U.S. Pat. No. 3,488,800 to Kornylak.

The following are examples of the process and the product prepared therefrom according to this invention; they are not intended to be exclusive of the full scope of this invention but merely set out certain preferred embodiments thereof.

EXAMPLE 1

The following materials were fed to a conventional foaming apparatus to form foamed polyurethane compositions in the continuous preparation of a rectangular bun having thirty inch sides.

| INGREDIENTS | PARTS BY WEIGHT |
|---|---|
| Propoxylated glycerol, MW=3500, hydroxyl number=48 | 10 |
| Polyester derived from diethylene glycol, trimethylol propane and adipic acid, MW=2000, hydroxyl number=52 | 90 |
| Tolylene diisocyanate (80/20), (TDI index 108) | 45.1 |
| Ethoxypropoxylated polysiloxane (added separately to the mixing head) | 1.7 |
| Mixture of stannous octoate and cresyl diphenyl phosphate in 1:1 weight ratio | 0.45 |
| Carbon black dispersion in cresyl diphenyl phosphate, 12 weight per cent carbon black | 3.0 |
| N-ethyl morpholine | 0.1 |
| Water (added to the mixng head in admixture with the propoxylated glycerol) | 1.5 |
| Triethylene diamine/dipropylene glycol mixture in a 33/67 weight ratio | 0.4 |
| Ethoxypropoxylated polysiloxane (added to the mixing head in admixture with the propoxylated glycerol) | 1.4 |
| Water (added to the mixing head in admixture with the polyester) | 2.08 |
| Aqueous dispersion of tetramethyl thiuram disulfide in water in a 45/55 weight ratio | 0.4 |
| Ethoxypropoxylated polysiloxane (added to the mixing head in admixture with the polyester) | 0.1 |
| Stearyl methacrylate | 3.0 |

The above ingredients were metered to and blended in a conventional mixing head for foamable polyurethane reaction mixtures. The stirrer was operated at 4,700 R.P.M. and the polyester was introduced into the mixing head at the rate of 20.5 kilograms per minute. The blended reaction mixture was fed to a conveyor mold where the mixture was permitted to foam and solidify. An open foam of good quality was thereby produced.

EXAMPLE 2

The procedure of Example 1 was repeated, with the exception that 3.5, rather than 3.0, parts by weight of stearyl methacrylate was used. A foam of similar quality was produced.

EXAMPLE 3

The following materials were fed to a conventional foaming apparatus to form foamed polyurethane compositions in the continuous preparation of round buns.

| INGREDIENTS | PARTS BY WEIGHT |
|---|---|
| Propoxylated glycerol, | 10 |

-Continued

| INGREDIENTS | PARTS BY WEIGHT |
|---|---|
| MW=3500, hydroxyl number=48 | |
| Polyester derived from diethylene glycol, trimethylol propane and adipic acid, MW=2000, hydroxyl number=52 | 90 |
| Tolylene diisocyanate (80/20) TDI index 110 | 47 |
| Ethoxypropoxylated polysiloxane (added separately to the mixing head) | 2.0 |
| Mixture of stannous octoate and cresyl diphenyl phosphate in 1:1 weight ratio | 0.3 |
| Mixture of 30% furnace carbon black, 6% dispersing agent and 64% water, by weight | 4.0 |
| Tertiary amine derivative of morpholine | 0.25 |
| Water | 1.0 |
| Ethoxypropoxylated polysiloxane (added to the mixing head in admixture with the propxylated glycerol) | 1.5 |
| Stearyl methacrylate (added to the mixing head in admixture with the polyester) | 3.0 |
| Tris (1,3-dichloropropyl) phosphate | 5.0 |

The above ingredients were metered to and blended in a conventional mixing head for foamable polyurethane reaction mixtures. The stirrer was operated at 4,700 R.P.M. and the polyester was introduced into the mixing head at the rate of 20.5 kilograms per minute. The blended reaction mixture was fed to a conveyor mold where the mixture was permitted to foam and solidify. An open foam of good quality was thereby produced.

EXAMPLE 4

The procedure of Example 3 was repeated, with the exception that 0.3 parts by weight of a 50/50 by weight mixture of stannous octoate in dioctyl phthalate was substituted for the stannous octoate/cresyl diphenyl phosphate mixture. A foam similar in quality to that of Example 3 was produced, except that the cells in the foam were slightly more erratic.

EXAMPLE 5

The following materials were fed to a conventional foaming apparatus to form foamable polyurethane compositions in the continuous preparation of 24 inch squares.

| INGREDIENTS | PARTS BY WEIGHT |
|---|---|
| Partially hydrolyzed castor oil | — |
| Polyester derived from diethylene glycol, trimethylol propane and adipic acid, MW=2000, hydroxyl number=52 | 90 |
| Propoxylated glycerol, MW=3500, hydroxyl number=48 | 10 |

-Continued

| INGREDIENTS | PARTS BY WEIGHT |
|---|---|
| Tolylene diisocyanate (80/20) TDI index 110 | 47 |
| Ethoxypropoxylated polysiloxane (added separately to the mixing head) | 2.0 |
| Mixture of stannous octoate and cresyl diphenyl phosphate in 1:1 weight ratio | 0.3 |
| Mixture of 30% furnace carbon black, 6% dispersing agent and 64% water, by weight | 4.0 |
| Water | 1.0 |
| Tertiary amine derivative of morpholine | 0.25 |
| Ethoxypropoxylated polysiloxane (added to the mixing head in admixture with the polyester) | 1.5 |
| Stearyl methacrylate (added to the mixing head in admixture with the polyester) | 2.5 |
| Tris (1,3-dichloropropyl) phosphate | 5.0 |

The above ingredients were metered to and blended in a conventional mixing head for formable polyurethane reaction mixtures. The stirrer was operated at 4,700 R.P.M. and the polyester was introduced into the mixing head at the rate of 20.5 kilograms per minute. The blended reaction mixture was fed to a conveyor mold where the mixture was permitted to foam and solidify. An open foam of good quality was produced.

EXAMPLE 6 AND 7

In a conventional high-pressure foam-machine capable of delivering 60 lbs./minute total polyol, there were made foams differing only in the compositions noted below in parts by weight (pbw).

| | Example 6 | Example 7 |
|---|---|---|
| Ester Polyol of Example 1 | 85 pbw | 90 pbw |
| Ether Polyol of Example 1 | 15 | 10 |
| JW-50 Silicone Oil | 0.4 | 0.0 |
| Octadecyl Methacrylate | 0.0 | 4.0 |
| Tris (1,3-dichloropropyl) phosphate | 0.0 | 2.5 |

Of the resultant foams, that of Example 7 was more uniformly and intensely colored by the same amount of black pigment.

Peelings of the foams were laminated by flame to both the same acetate face fabric, and the same nylon tricot as back fabric, under the same conditions for each of the foams. As soon as each foam lamination was made, its fresh ("green") bond strength was measured, and remeasured after 24 hours (cured dry bond strength). The cured laminates were then thoroughly soaked in water, wrung out, and bond strengths of the wet laminates retested. Bond strengths of each laminate were also tested, dry, after five wash and dry clean cycles, with the following results:

|   | | Example 6 | Example 7 |
|---|---|---|---|
| A. Green | Bond Strength: | | |
|   | Face Fabric | Delaminated (less than 1 oz.) | Can't separate |
|   | Back Fabric | Delaminated (less than 1 oz.) | 5 oz. |
| B. Cured | Bond Strength(Dry): | | |
|   | Face Fabric | 10–12 oz. | Can't separate |
|   | Back Fabric | 5–6 oz. | 5 oz. |
| C. Cured | Bond Strength(Wet): | | |
|   | Face Fabric | Low(about 3 oz.) | Can't separate |
|   | Back Fabric | Low(about 3 oz.) | 3 oz. |
| D. Wash, | Dry Clean Strength | | |
|   | Face Fabric | 9 oz. | Can't separate |
|   | Back Fabric | 5 oz. | 6–7 oz. |

EXAMPLES 8 THROUGH 22

In each of these examples, the foam formulations consisted of the following:

| INGREDIENTS | PARTS BY WEIGHT |
|---|---|
| Polyester derived from diethylene glycol, trimethylol propane and adipic acid, MW=2000, hydroxyl number=52 | 85.0 |
| Propoxylated glycerol, MW=3500, hydroxyl number=48 | 15.0 |
| Ethoxypropoxylated polysiloxane | 2.50 |
| Mixture of triethylene diamine and dipropylene glycol in a 33/67 weight ratio (in examples 18 and 19, 0.8 rather than 0.50) | 0.50 |
| Mixture of stannous octoate and cresyl diphenyl phosphate in a 1/1 weight ratio | 0.30 |
| Water | 1.00 |
| Tolylene Diisocyanate (80/20), TDI index 113 | |
| Mixture of 30% carbon black, 6% dispersing agent and 64% water, by weight | 4.00 |
| Cell Opener (except in Examples 16, in which none was used, Example 17 in which 2.0 was used, and Example 18 in which 6.0 was used). | 4.0 |

The formulations of Examples 8 through 22 were fed to a conventional foaming apparatus to form foamed polyurethane compositions with the following results:

| Example | Cell Opener | Air permeability, cubic feet per minute | Density pounds/feet³ | Cell Count |
|---|---|---|---|---|
| 8 | Stearyl Methacrylate | 6.30 | 1.64 | 32 |
| 9 | Stearyl Methacrylate | 6.10 | 1.72 | 38 |
| 10 | 2 Ethyl Hexyl Acrylate | 5.30 | 1.84 | 38 |
| 11 | Methyl Methacrylate | 4.90 | 1.57 | 38 |
| 12 | Butyl Methacrylate | 5.50 | 1.63 | 32 |
| 13 | Lauryl Methacrylate | 5.60 | 1.72 | 32 |
| 14 | Butyl Oleate | 9.10 | 1.82 | 36 |
| 15 | Butyl Stearate | 7.10 | 1.66 | 34 |
| 16 | none | 4.90 | 1.64 | 36 |
| 17 | Butyl Oleate | 6.60 | 1.65 | 36 |
| 18 | Butyl Oleate | 9.90 | 2.05 | 32 |
| 19 | Methyl ester of mixture of straight chain aliphatic monocarboxylic acids:3% $C_{14}$,26.5% $C_{16}$,4.0% $C_{16}$ (monounsaturated (1.7% $C_{17}$, 19% $C_{18}$,43% $C_{18}$ (monounsaturated) and 3% $C_{18}$ (di-unsaturated), by weight | 6.10 | 1.53 | 38 |
| 20 | Methyl ester of substantially saturated mixture of straight-chain aliphatic monocarboxylic acids: 5.2% $C_6$,55% $C_8$,39% $C_{10}$ and 0.8% $C_{12}$, by weight. | 6.50 | 1.63 | 44 |
| 21 | Methyl ester of substantially saturated mixture of straight-chain aliphatic monocarboxylic acids: 0.1% $C_{10}$, 1.0% $C_{12}$,96% $C_{14}$ and 2.9% $C_{16}$, by weight. | 6.20 | 1.71 | 42 |
| 22 | Methyl ester of substantially saturated mixture of straight-chain aliphatic monocarboxylic acids: 0.4% $C_6$-$C_{10}$,92% $C_{12}$, 7.5% $C_{14}$ and 0.1% $C_{16}$, by weight | 5.95 | 1.52 | 36 |

In Examples 7 through 22, the air permeability, density and cell count were measured as described in ASTM D-1564. The air permeability was determined by measuring the air flow required to maintain a constant pressure drop of 0.5 in. $H_2O$ across a sample of foam 1 inch thick and 2 inches × 2 inches square. The greater the amount of air flow required in cubic feet per minute, to reach the required pressure drop, the greater the permeability.

EXAMPLE 23

The foam formulation consisted of the following:

| INGREDIENTS | PARTS BY WEIGHT |
|---|---|
| Propoxylated glycerol, hydroxyl number 56, molecular weight 3000 | 100 |
| Ethoxypropoxylated polysiloxane | 1.0 |
| Mixture of stannous octoate and cresyl diphenyl phosphate in a 1:1 weight ratio | 0.2 |
| Water | 4.4 |
| Tolylene diisocyanate (80/20). TDI index 110 | 59.3 |
| Stearyl methacrylate | 10.0 |

The mixture was foamed to produce a foam having a density of 1.43 pounds per cubic foot and an air permeability of 6.8.

EXAMPLES 24 THROUGH 27

In each of these examples, the foam formulations contained the following:

| INGREDIENTS | PARTS BY WEIGHT |
|---|---|
| Polyester polyol of Example 1 | 180 |
| Propoxylated glycerol of Example 1 | 20 |
| Tertiary amine catalyst | 0.5 |
| Water | 2.0 |
| Tolylene diisocyanate (80/20). TDI index 110 | 90.8 |
| Mixture of 30% carbon black, 6% dispersing agent and 64% water, by weight | 8.0 |
| Tris (1,3-dichloropropyl phosphate) | 6.4 |
| Mixture of stannous octoate and cresyl diphenylphosphate in a 1:1 weight ratio | 0.6 |
| Organosiloxane surfactant | 4.7 |

In Examples 24 through 26, the formulations included 4.0, 6.0 and 8.0 parts of trimethylol-propane trimethacrylate, respectively, and in Example 27 the formulation contained 4.0 parts of ethylene glycol dimethacrylate.

The foams produced from Examples 24 through 27 had, respectively, densities of 1.77, 1.85, 1.82 and 1.83 pounds per cubic foot, and air permeabilities of 6.2, 7.0, 6.4 and 6.8.

EXAMPLES 28 THROUGH 30

In each of these examples, the foam formulations contained the following:

| INGREDIENTS | PARTS BY WEIGHT |
|---|---|
| Propoxylated glycerol of Example 1 | 100 |
| Ethoxypropoxylated polysiloxane | 0.8 |
| Freon 11 | 3.0 |
| Stannous octoate | 0.12 |
| N-ethylmorpholine | 0.6 |
| Mixture of stannous octoate and cresyl diphenyl phosphate in a 1:1 weight ratio | 0.2 |
| Water | 4.3 |
| Tolylene diisocyanate (80/20) TDI index 113 | 54.8 |
| Red dye | 2.0 |

In Examples 28 through 30 the formulations also contained, respectively, 3.0, 6.0 and 9.0 parts of trimethylolpropane trimethacrylate.

The foams produced in Examples 28 through 30 had, respectively, densities of 1.35, 1.34 and 1.33 pounds per cubic foot, and air permeabilities of 3.8, 4.7 and 6.8.

What is claimed is:

1. In a process for the preparation of a flexible cellular solid urethane polymer from a reaction mixture including a polyol, an organic polyisocyanate, a blowing agent and a hydrophilic organsilicon foam-stabilizing emulsifier-surfactant designed and adapted for use in the preparation of urethane polymer foam from a polyether polyol and an organic polyisocyanate, the improvement which comprises employing as the polyol reactant (1) a polyether polyol or (2) a polyester polyol admixed with at least two percent by weight of a polyether polyol, based upon the weight of the mixture of polyester polyol and polyether polyol, and including in the reaction mixture at least one ester of the formula (RCOO)n R' in a suitable proportion whereby a nonlustrous, substantially membrane-free foam is obtained, R and R' in the preceding formula being alkyl or alkenyl groups having from one to 30 carbon atoms, at least one of R and R' having at least three carbon atoms, and $n$ being an integer from 1 to 3, with the proviso that when $n$ is one at least one of R and R' has at least eight carbon atoms.

2. The process of claim 1 wherein said blowing agent is water.

3. The process of claim 1 wherein said organic polyisocyanate is an aromatic diisocyanate.

4. The process of claim 1 wherein said blowing agent is water, wherein said organic polyisocyanate is an aromatic dissocyanate, and wherein (RCOO)n R' is stearyl methacrylate.

5. The process of claim 1 wherein said blowing agent is water, wherein said organic polyisocyanate is an aromatic diisocyanate, and wherein (RCOO)n R' is 2-ethylhexyl acrylate.

6. The process of claim 1 wherein said blowing agent is water, wherein said organic polyisocyanate is an aromatic diisocyanate, and wherein (RCOO)n R' is lauryl methacrylate.

7. The process of claim 1 wherein said blowing agent is water, wherein said organic polyisocyanate is an aromatic diisocyanate, and wherein (RCOO)n R' is butyl oleate.

8. The process of claim 1 wherein said blowing agent is water, wherein said organic polyisocyanate is an aromatic diisocyanate, and wherein (RCOO)n R' is butyl stearate.

9. The process of claim 1 wherein said blowing agent is water, wherein said organic polyisocyanate is an aromatic diisocyanate, and wherein (RCOO)n R' is trimethylolpropane trimethacrylate.

10. The process of claim 1 wherein said blowing agent is water, wherein said organic polyisocyanate is an aromatic diisocyanate, and wherein (RCOO)n R' is ethylene glycol dimethacrylate.

11. The process of claim 1 wherein the amount of ester is from about two to about 10 parts by weight per 100 parts total weight of said polyol.

* * * * *